US012046764B2

(12) United States Patent
Maffazioli

(10) Patent No.: US 12,046,764 B2
(45) Date of Patent: Jul. 23, 2024

(54) COIN CELL BRACKET

(71) Applicant: SumUp Payments Ltd., London (GB)

(72) Inventor: Ricardo Maffazioli, Berlin (DE)

(73) Assignee: SUMUP PAYMENTS LTD., London (GB)

( * ) Notice: Subject to any disclaimer, the term of this patent is extended or adjusted under 35 U.S.C. 154(b) by 193 days.

(21) Appl. No.: 17/393,229

(22) Filed: Aug. 3, 2021

(65) Prior Publication Data
US 2023/0041934 A1 Feb. 9, 2023

(51) Int. Cl.
H01M 50/216 (2021.01)
H01M 10/04 (2006.01)
H01M 10/42 (2006.01)

(52) U.S. Cl.
CPC ..... *H01M 50/216* (2021.01); *H01M 10/0427* (2013.01); *H01M 10/425* (2013.01); *H01M 2220/30* (2013.01)

(58) Field of Classification Search
CPC . H01M 10/0422–0427; H01M 10/623; H01M 50/20–202; H01M 50/56; H01M 50/242–244; H01M 50/247; H01M 50/271; H01M 50/543; H01M 50/552; H01M 50/559; H01M 2220/30; H01M 50/216; H01M 10/0425; H01M 50/109; H01M 50/213; H01M 50/284; H01M 10/425; H01M 10/0585; H05K 1/81; H05K 1/181; H05K 2201/10037; H05K 2201/1028; H05K 2201/10325; H05K 2201/10462–10643; H05K 3/32–325; H05K 3/301; H01R 13/405; H01R 43/16; H01R 43/24; H01R 4/48; H01R 12/57–58; H01R 11/218; H01R 13/2442; H01R 13/2457; F16F 1/18–30; Y02E 60/10; H01G 11/74
See application file for complete search history.

(56) References Cited

U.S. PATENT DOCUMENTS 6,722,916 B2 4/2004 Buccinna et al.
7,371,108 B2 5/2008 Sun
(Continued)

FOREIGN PATENT DOCUMENTS

WO WO-2017166574 A1 * 10/2017 ............. H01M 2/10

OTHER PUBLICATIONS

Memory Protection Devices, Inc. "Coin Cell Retainer for 20mm dia Batteries," Drawing No./Part No. BK-888, Oct. 2019. <https://www.memoryprotectiondevices.com/datasheets/BK-888-datasheet.pdf> (Year: 2019).*

(Continued)

Primary Examiner — Allison Bourke
Assistant Examiner — Bethany C Garcia
(74) Attorney, Agent, or Firm — Synergy Patent Group LLC

(57) ABSTRACT

Various aspects of the disclosure generally relate to a battery bracket for electronic devices. In one aspect, an electronic component includes a printed circuit board (PCB) having a first and a second battery contact. Connected to the PCB is a battery bracket having a first, a second and a third foot, each foot extending in a first plane. At least one of the feet is connected to the first battery contact. Each of the first, second and third feet are coupled to a first, a second and a third sidewall, respectively.

20 Claims, 10 Drawing Sheets

(56) References Cited

U.S. PATENT DOCUMENTS

| | | | |
|---|---|---|---|
| 8,765,284 B2 | 7/2014 | Tucholski | |
| 9,793,580 B2 | 5/2017 | Herklotz et al. | |
| 10,270,175 B2 | 4/2019 | Benbouhout et al. | |
| 2003/0118875 A1* | 6/2003 | Wu | H01M 50/213 |
| | | | 429/97 |
| 2004/0076858 A1* | 4/2004 | Bartholf | H01M 50/216 |
| | | | 429/96 |
| 2008/0268701 A1* | 10/2008 | Yuan | H01M 50/50 |
| | | | 439/500 |
| 2010/0047677 A1* | 2/2010 | Ornt | H01M 50/216 |
| | | | 429/100 |
| 2018/0198100 A1* | 7/2018 | Blaha | H01M 10/425 |

OTHER PUBLICATIONS

Memory Protection Devices, Inc., "Coin Cell Retainer," Drawing No./Part No. BK-883, Feb. 2017. <https://www.memoryprotectiondevices.com/datasheets/BK-883-datasheet.pdf>. (Year: 2017).*

Wayback Machine, Data for public availability date of <https://www.memoryprotectiondevices.com/datasheets/BK-883-datasheet.pdf>. (Year: 2023).*

* cited by examiner

COIN CELL BRACKET

BACKGROUND

Field of the Disclosure

The disclosure relates generally to battery brackets, and more specifically to coin cell holders, or coin cell brackets, in electronic devices.

Description of Related Art

Fundamental to the functioning of the economy is the exchange of payment for goods and services. Throughout modern commercial history, payment has typically been rendered with money in the form of currency or cash such as banknotes and coins. Cash continues to be used to purchase goods and services, but it is becoming increasingly less common. In the United States, a study by Tufts University concluded that the cost of using cash amounts to around $200 billion per year. This is primarily the costs associated with collecting, sorting and transporting the physical currency, but also includes expenses like automated teller machine (ATM) fees. The study also found that the average American wastes five and a half hours per year withdrawing cash from ATMs, which is just one of the many inconvenient aspects of physical currency. Physical currency is often unhealthy too. Researchers in Ohio spot-checked cash used in a supermarket and found 87% contained harmful bacteria.

Conventional financial transactions are fundamentally based on the value of currency, but often involve the transfer of funds that do not require the physical exchange of cash.

In the United States, the Federal Reserve Bank's Automated Clearing House (ACH) Network is a processing and delivery system that provides for the distribution and settlement of electronic credits and debits among financial institutions, and functions as an electronic alternative to paper checks. Unlike a check, which is always a debit instrument, an ACH entry may be either a credit or a debit entry. The ACH Network is also widely used to settle consumer transactions made at ATMs and point-of-sale (POS) terminals.

Physical currency is already being replaced by cryptocurrencies like Bitcoin. Bitcoin allows for direct transfers of funds between parties, without the need for a third party. A wide range of startups are now developing products based on the Bitcoin protocols, in the hope that it will compete with other global payment systems. Cash transactions worldwide rose just 1.75% between 2008 and 2012, to $11.6 trillion. Meanwhile, non-traditional payment methods rose almost 14% to total $6.4 trillion. This group includes online and mobile payment systems including PayPal, Google Wallet, Apple Passbook, and other cashless alternatives.

Thrive Analytics 2014 Digital Wallet Usage Study revealed that, despite nearly 80% of consumers being aware of digital wallets, including major players like PayPal, Google Wallet, and Apple Passbook, security concerns remain the main barrier to adoption, followed by lack of usability versus credit cards/cash (37%) and not being top of mind as a form of payment at the time of purchase (32%). Meanwhile, MasterCard and Visa face obstacles as they try to become players in the digital wallet game.

Other companies produce a point-of-sale credit card reader and app that provides transparent pricing, reliable technology and is available for major credit cards plus Google Pay and Apple Pay. Contrasting this with a traditional credit card terminal, which contains the hardware and software for generating an authorization request, these card readers work in conjunction with online systems to generate that request. Security and ensuring the secrecy of user credit card information is paramount in any credit card reader and strict standards apply to the construction and operation of these POS readers. While meeting security standards, the makers of these readers must design a product that is rugged, reliable and long-living.

In line with that need for and expectation of reliability, a credit card processing terminal is expected to be compact with long battery life. As such, a variety of batteries may be used within the device. Daily use of a compact electronic device exposes it to hazards such as jarring, jostling and dropping. Aside from potential breakage of the electronic components, these hazards can cause the battery or batteries within a device to be displaced such that contact is no longer made with the terminals and power is lost. Even worse, if not sufficiently secured, the mechanism holding a battery in place may break free from its mount, sometimes resulting in an end-of-life event for the electronic device.

What's needed is a coin cell bracket with more robust attachment capability and better battery retention.

SUMMARY

The systems, methods and devices of this disclosure each have several innovative aspects, no single one of which is solely responsible for the desirable attributes disclosed herein.

In one aspect, an electronic component includes a printed circuit board (PCB) having a first and second battery contact. Connected to the PCB is a battery bracket having a first, a second and a third foot, each foot extending in a first plane. At least one of the feet is connected to the first battery contact of the PCB. Each of the first, second and third feet are coupled to a first, a second and a third sidewall, respectively. The sidewalls are coupled to a flat cover extending in a second plane parallel to the first plane. The cover extends continuously from the first sidewall to the second sidewall, and from the second sidewall to the third sidewall. The battery bracket has a first open space between the first and second sidewalls and between the cover and the PCB, along a plane perpendicular to the cove. The cover fully encircles a first contact hole. A first engagement arm is coupled to the cover and biased through the first contact hole and extends away from the second plane.

In another aspect, a battery bracket comprises a planar cover sized to conceal a majority of the surface area of one side of a coin cell battery. The cover consists of three feet configured to be coupled to a printed circuit board (PCB) and conduct electricity thereto. The cover further comprises a plurality of engagement arms coupled to the cover and biased to extend away from the plane of the cover. The cover in conjunction with the PCB are configured to have three openings, each of the three openings perpendicular to the plane of the cover. One of the three openings is sized to accommodate a coin cell battery. Two of the openings are smaller than the coin cell battery.

In yet another aspect, an electronic component comprises a printed circuit board (PCB) having a first and second battery contacts. A battery bracket has a first, a second and a third foot, each foot extending in a first plane. At least one of the feet is connected to the first battery contact. Each of the first, second and third feet are coupled to a first, a second and a third sidewall, respectively. The sidewalls are coupled to a flat cover extending in a second plane parallel to the first plane. The first sidewall is perpendicular to the first foot. The second sidewall is perpendicular to the second foot. The third sidewall is perpendicular to the third foot. The first and third sidewalls are parallel to one another. The second sidewall is perpendicular to the first and third sidewalls. The cover extends continuously from the first sidewall to the second sidewall, and from the second sidewall to the third sidewall. The battery bracket has a first open space between the first and second sidewalls and between the cover and the PCB, along a plane perpendicular to the cover. The battery bracket has a second open space between the second and third sidewalls and between the cover and the PCB, along a plane perpendicular to the cover. The first and second open spaces are sized smaller than a coin cell battery and positioned to assist in removal of the coin cell from the battery bracket. A third open space is between the third and first sidewalls and between the cover and the PCB. The third open space is sized to accommodate passage of a coin cell battery into the battery bracket. The cover fully encircles a first contact hole. A first engagement arm is coupled to the cover and is biased through the first contact hole and extends away from the second plane. The cover fully encircles a second contact hole. A second engagement arm is coupled to the cover and is biased through the second contact hole and extends away from the second plane. The cover has a near side to the PCB and a far side to the PCB. The first engagement arm is coupled to the far side of the cover and is biased towards the PCB. The second engagement arm is coupled to the far side of the cover and is biased towards the PCB.

The above-described battery bracket provides enhanced attachment capability to a PCB with the three feet, while the engagement arms biased in towards where the battery is stored provide increased holding power over the battery.

The foregoing has outlined rather broadly the gestures and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of this disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
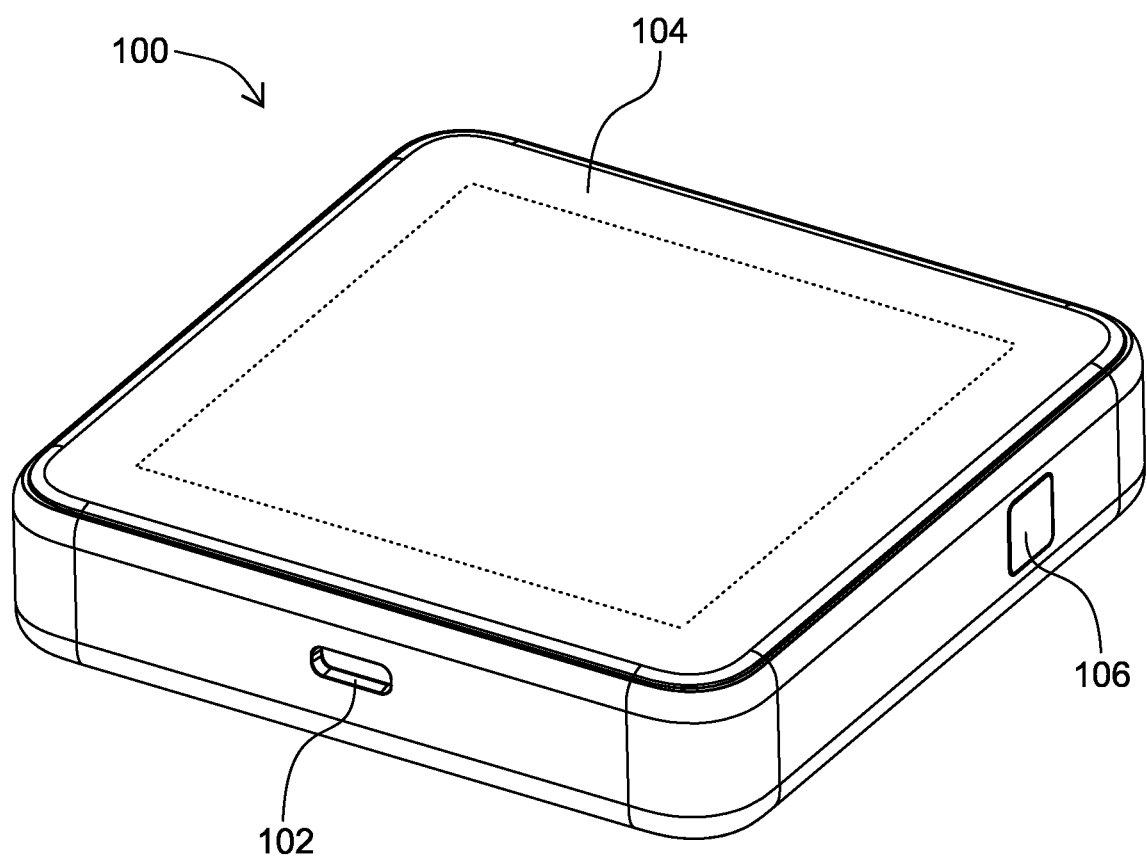
FIG. 1 is a top right perspective view illustrating one example of a credit card reader.

Various aspects of the disclosure are described more fully herein with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented, or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure may be embodied by one or more elements of a claim.

A point-of-sale (POS) credit card reader may physically interact with payment instruments such as magnetic stripe payment cards, Europay, MasterCard and Visa (EMV) payment cards, and short-range communication (e.g., near field communication (NFC), radio frequency identification (RFID), Bluetooth, Bluetooth® low energy (BLE), etc.) payment instruments. The reader may provide a rich user interface through the display, communicate with the payment reader, and communicate with a payment processing service server, which may communicate with payment processing service provider server(s). In this manner, the reader may collectively process transaction(s) between a merchant and customer(s).

POS readers may be mobile, such that POS readers may process transactions in disparate locations across the world. For various reasons, a payment processing service provider may contract with a payment processing service regarding where the payment processing service is permitted to collectively process card-present transactions between merchants that utilize POS readers serviced by the payment processing service and customers. As a non-limiting example, a payment processing service provider may contract with a payment processing service such that the payment processing service is permitted to process card-present transactions on behalf of a merchant via a POS reader serviced by the payment processing service in one or more particular regions but is not permitted to process transactions on behalf of the merchant in any region that is not one of the one or more particular regions. For instance, a payment processing service provider may contract with a payment processing service such that the payment processing service is permitted to process card-present transactions on behalf of the merchant in the United States, Canada, and Australia, but is not permitted to process card-present transactions on behalf of the merchant in any other country. That is, if the merchant tries to transact with a customer in China via a card-present transaction using a POS reader serviced by the payment processing service and the payment processing service processes the card-present transaction, the payment processing service may breach its contract with the payment processing service provider. Accordingly, the payment processing service may refrain from processing the card-present transaction (i.e., the payment processing service may not transmit the card-present transaction to the payment processing service provider) to avoid breaking its contract with the payment processing service provider.

For the purpose of this disclosure, a card-present transaction is a transaction where both a customer and their payment instrument are physically present at the time of the transaction. Card-present transactions may be processed by swipes, dips, and/or taps. A swipe is a card-present transaction where a customer slides a card having a magnetic strip through a payment reader that captures payment data contained in the magnetic strip. A dip is a card-present transaction where a customer inserts a card having an embedded microchip (i.e., chip) into a payment reader chip-side first. The card remains in the payment reader until the payment reader prompts the customer to remove the card. While the card is in the payment reader, the microchip creates a one-time code which is sent from the POS reader to a server associated with a payment processing service, a bank, and/or a card payment network (e.g., Mastercard, VISA, etc.) to be matched with an identical one-time code. A tap is a card-present transaction where a customer may tap or hover his or her electronic device such as a smart phone running a payment application over a payment reader to complete a transaction via short-range communication (e.g., NFC, RFID, Bluetooth®, BLE, etc.). Short-range communication enables the electronic device to exchange information with the payment reader. A tap may also be called a contactless payment. In some countries, a customer may engage in a tap using a TAP card instead of an electronic device.

The phrases "in some examples," "according to various examples," "in the examples shown," "in one example," "in other examples," "various examples," "some examples," and the like generally mean the particular feature, structure, or characteristic following the phrase is included as at least one example, and may be included in more than one example without specifically being referred to as such. In addition, such phrases do not necessarily refer to the same examples or to different examples.

If the specification states a component or feature "may," "can," "could," or "might" be included or have a characteristic, that particular component or feature is not required to be included or have the characteristic.

The preceding summary is provided for the purposes of summarizing some examples to provide a basic understanding of aspects of the subject matter described herein. Accordingly, the above-described features are merely examples and should not be construed as limiting in any way. Other features, aspects, and advantages of the subject matter described herein will become apparent from the following description of Figures and Claims.

FIG. 1 illustrates one example of credit card processing reader 100 such as a point-of-sale (POS) reader for on-premises credit card payments. Such readers typically meet industry requirements if used for processing Visa, Mastercard, American Express, JCB or Discover payments. The security standards are set by the Payment Card Industry Security Standards Council (PCI SSC), which also sets standards for personal identification number (PIN) transaction security (PTS). One of the security standards set is the Payment Card Industry Data Security Standard (PCI DSS). Other security standards are set by a European subgroup of the Joint Interpretation Library (JIL) working group, called the JIL Terminal Evaluation Methodology Subgroup, or JTEMS. The standards serve to protect against fraud and provide for secure entry and transmission of PIN and account data. POS terminals and readers are used in the retail, restaurant, entertainment, healthcare, and service industries, to name a few.

Reader 100 may be a standalone device, or it may be mounted within or on to a cradle, bracket or other holder (not illustrated) and interface through port 102. Port 102 may be any type of serial or parallel communication port, for example a universal serial bus (USB), or any other type of interface. In one example port 102 may be used to provide power to reader 100. In one example port 102 may be used for communication and power to reader 100. Other communication options for reader 100 are discussed below. On the side of reader 100 that is opposite port 102 is a slot (not visible in FIG. 1) into which a credit card may be inserted and read by a payment reader (not illustrated in FIG. 1). This describes a dip, but it should be understood that both a tap and a swipe are both included as potential transaction methods with an appropriately configured terminal, for example with near field communications (NFC). An NFC antenna (not shown in FIG. 1) may be located behind, for example, a display and enable interaction with other NFC devices. Display 104 may be any type of emissive or reflective display, or a combination thereof, for example LED, LCD, OLED, MEMS, ELD, QLED, etc. Additionally display 104 may be touch sensitive such that a user may interact with images present on display 104. Such interactions include viewing an amount to be charged to a card, transaction description, entry or selection of amounts for gratuity, signature input, transaction approval, and so on. Button 106 activates reader 100 and may be used to power down, power up, place reader 100 into a sleep/standby mode or awaken reader 100 from a sleep/standby mode.

Figure 2:
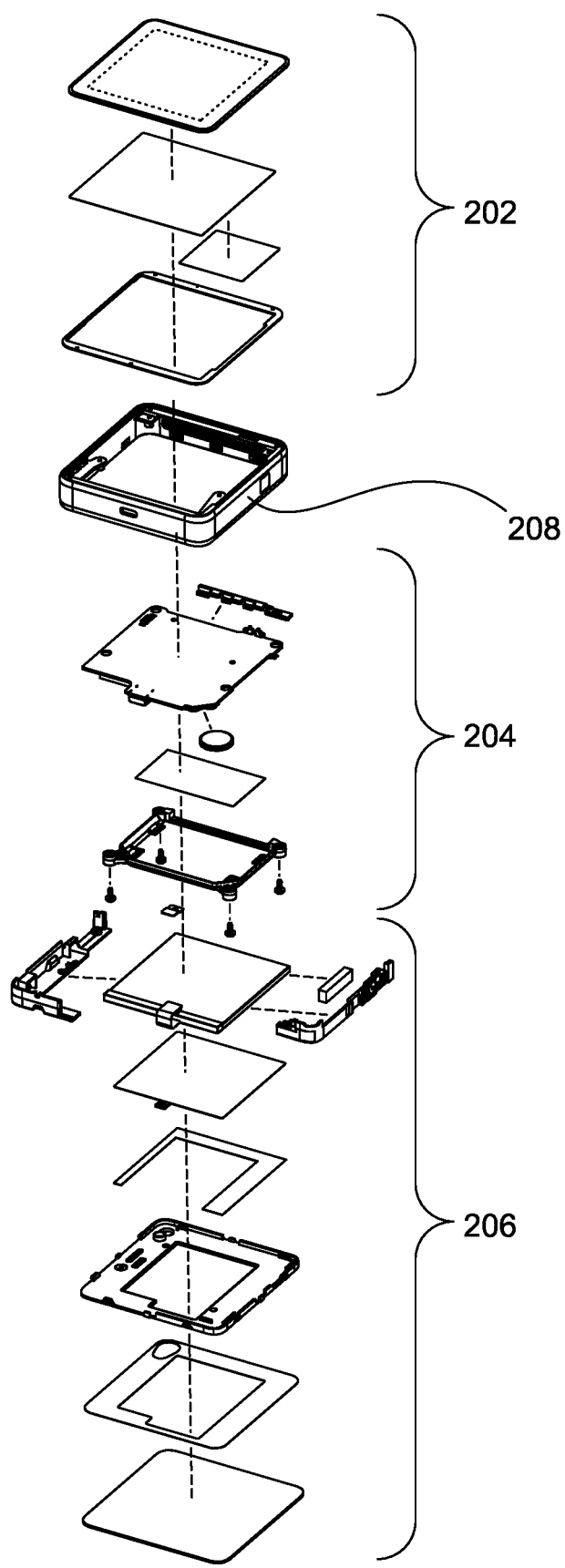
FIG. 2 is an exploded parts diagram illustrating one example of a credit card reader.

FIG. 2 is an exploded parts diagram illustrating one example of credit card processing reader 100. The illustrated parts are broadly grouped into three groups plus a structural component. The groups are communications assembly 202, secure circuit assembly 204 and rear assembly 206. Frame 208 is the structural component. The naming convention with respect to each group is in no way limiting to that group or any other group, for example communications assembly 202 may include more than just communication components, or secure circuit assembly 204 does not mean or imply that other groups are not secure, or that communications may be engaged by rear assembly 206, to name a few examples.

The assembly of reader 100 may be completed by collapsing the parts illustrated in FIG. 2, with communications assembly 202 attaching to the topmost section of frame 208, then secure circuit assembly 204 inserting within frame 208 and underneath communications assembly 202, with rear assembly inserting within frame 208 and under secure circuit assembly 204. This top-down orientation is maintained in FIG. 3, but reversed in FIGS. 4 and 5.

Figure 3:
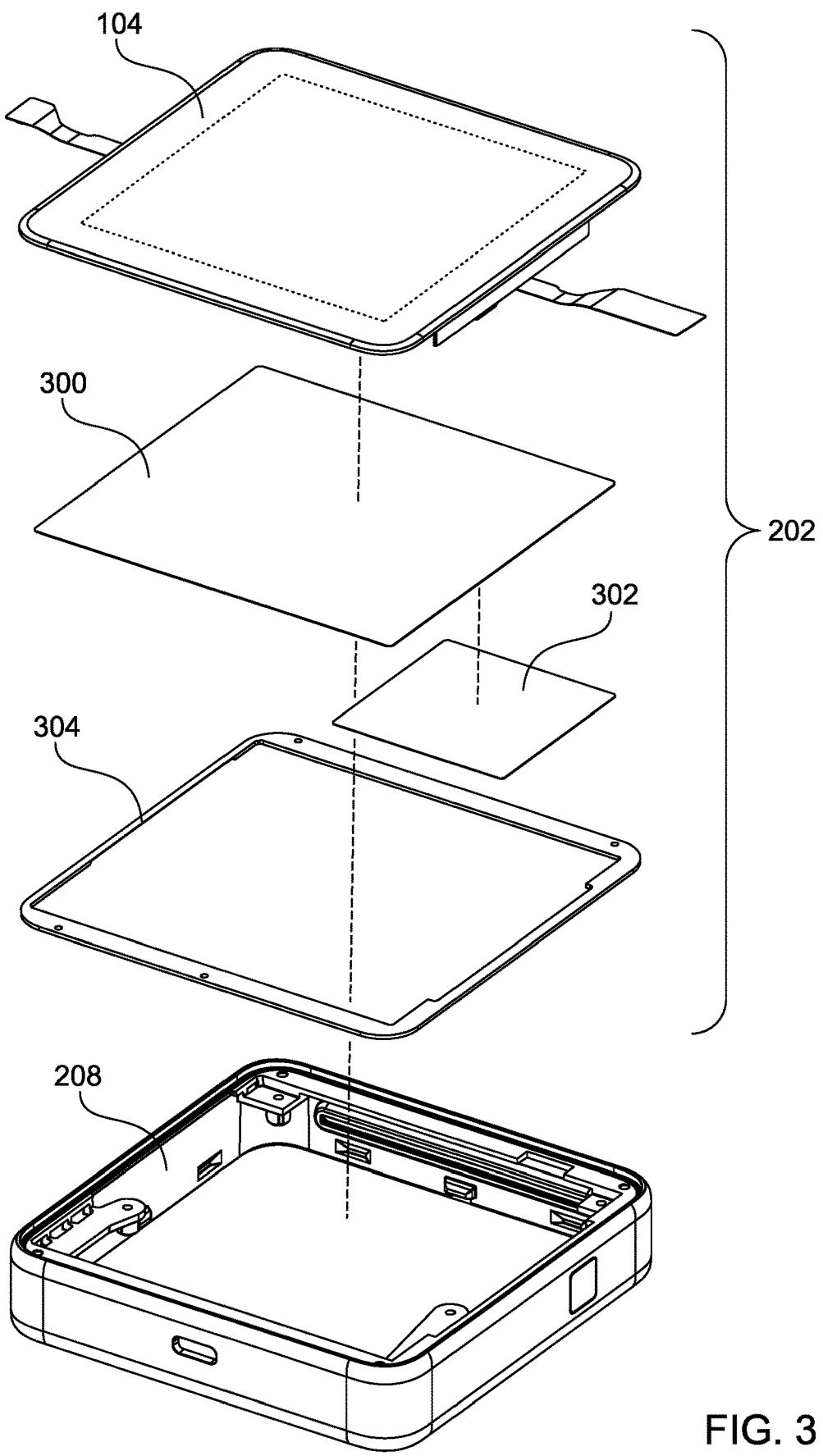
FIG. 3 is a partial exploded parts diagram illustrating one example of a communications assembly from a credit card reader.

FIG. 3 is a partial exploded parts diagram illustrating communications assembly 202 from FIG. 2 in a top-down orientation, as well as frame 208. Communications assembly 202 includes display 104 as previously described with respect to FIG. 1. Also included in communications assembly 202 is shield 300, reflector 302 and antennae 304. Shield 300 attenuates electromagnetic impulses between display 104 and antenna 304, as well as secure circuit assembly 204.

Shield 300 may be useful in reducing losses that occur from metal parts that are on the other side of shield 300 from display 104 (e.g. the PCB, the battery-conductive material that is near shield 300) reducing interference of communications and circuit processing by display 104. Shield 300 may be made from ferrite or other suitable shielding material for short range attenuation, for example NiZn, MnZn, etc.

Figure 5:
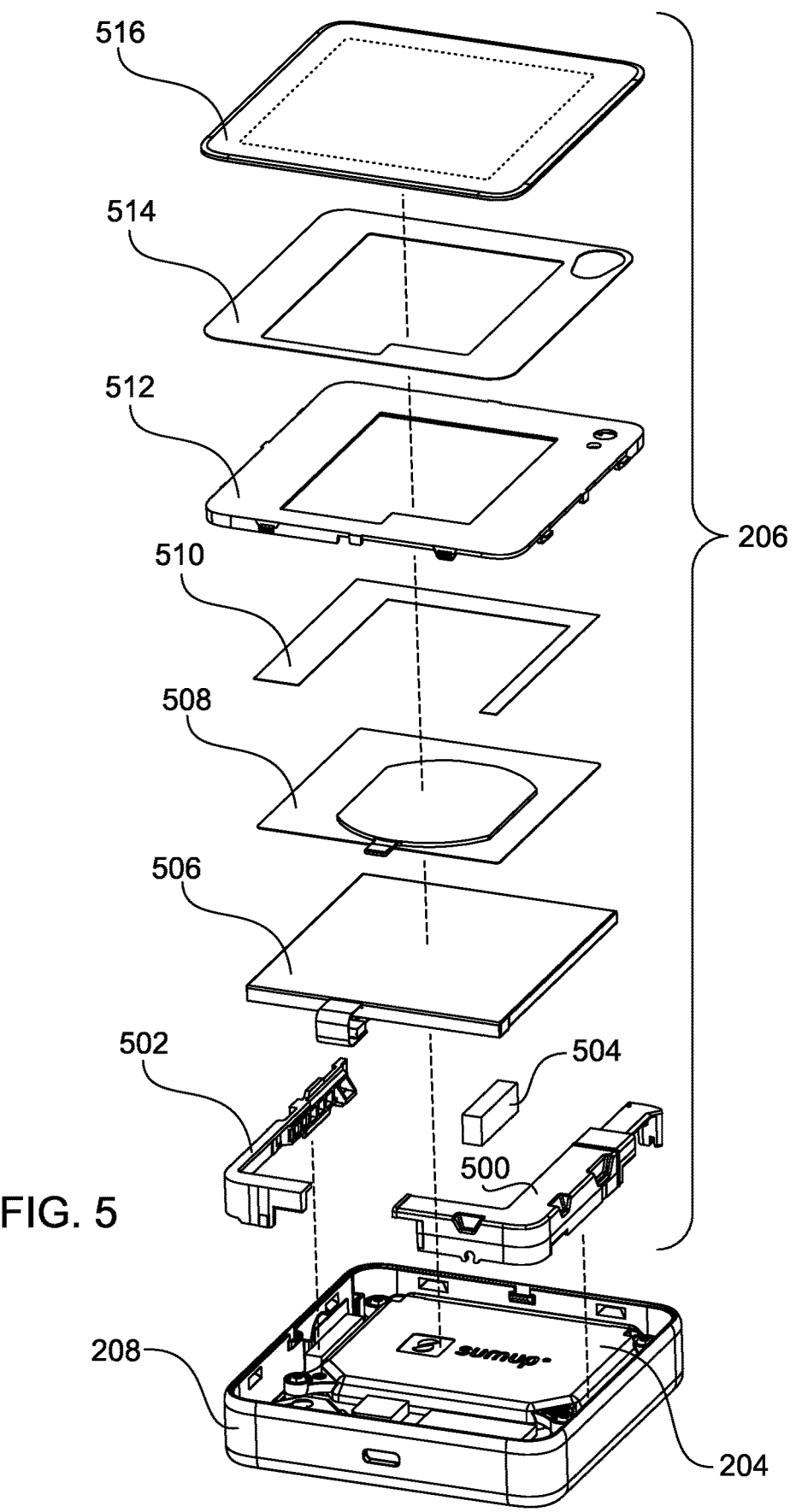
FIG. 5 is a partial exploded parts diagram illustrating one example of a rear assembly from a credit card reader.

Reflector 302 reduces efficiency losses that otherwise would occur for the cellular antenna (see FIG. 5). Reflector 302 may be made of a metal, for example copper, aluminum or steel.

Antennae 304 in this example may be a near field communication (NFC) antenna. NFC is based on inductive coupling between two antennas present on NFC-enabled devices, for example a POS credit card processing reader and a credit card. An NFC system can be used for communicating in one or both directions, using a frequency of 13.56 MHz. One practice of providing a small form factor for a POS reader is by placing a communication coil used by the NFC system in close proximity to the readout display of the processing device. Because of the proximity of the coil and display, operating aspects of the display may cause distortion of the waveforms from the NFC system.

Frame 208 provides structural support and integrity to reader 100 and may be made from injection molded plastic or any other suitable material and manufacturing method. From the perspective shown in FIG. 3, communications assembly 202 stack together near the top of frame 208 once pressed into place.

Figure 4:
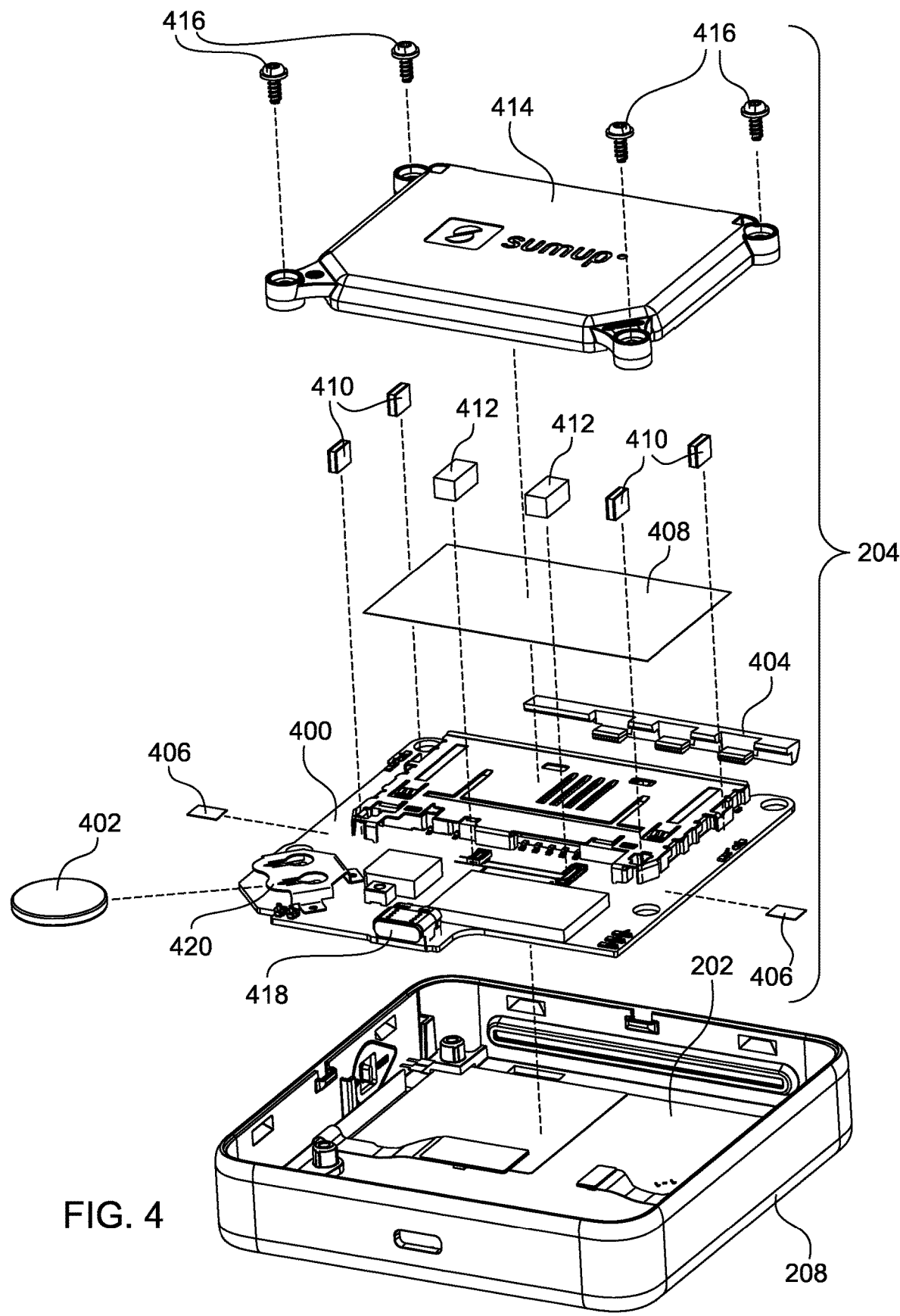
FIG. 4 is a partial exploded parts diagram illustrating one example of a secure circuit assembly from a credit card reader.

FIG. 4 is a partial exploded parts diagram illustrating secure circuit assembly 204 from FIG. 2 in a bottom-down orientation, as well as frame 208 and communications assembly 202. FIG. 4 is in the reverse orientation of FIG. 3, such that communications assembly 202 is pictured at the bottom of frame 208. Secure circuit assembly 204 includes printed circuit board (PCB) 400, battery 402, card guide 404, conductive tape 406, seal tape card connector 408, tamper switches 410, foam display cables 412, cover 414 and screws 416.

PCB 400 includes connector 418 (accessed through port 102), battery bracket 420, conductive LCD tape 406, seal tape card connector 408 to help reduce shorting issues, and foam spacers 412.

In a POS credit-card processing terminal or reader, secure covers and anti-tamper rubber switches are commonly used to pass penetration tests that verify the resistance of the reader against physical attack methods. Secure covers may have grabbers (also referred to as ribs)(not illustrated in FIG. 4) into which conductive rubber blocks are pressed to form a bridge between electrical pads. In one example, the conductive rubber blocks may be zebra connectors, or tamper switches 410. Electrical pads (not illustrated in FIG. 4) are respectively connected to electrical traces (not illustrated in FIG. 4) and are located on PCB 400. When cover 414 is tightened onto PCB 400 with screws 416, the resistance of tamper switches 410 changes until it is within a determined range. Once reader 100 is in use, if a change in resistance is detected with respect to the circuit connected to tamper switches 410, that is outside the determined range, then reader 100 registers that change as a tamper attempt and reader 100 may be blocked or disabled. Once activated, removing cover 414 dislodges tamper switches 410, causing a change in resistance across the electrical contacts and triggering a tamper attempt. Drilling into cover 414 and connecting a trace from one of the electrical pads, to a trace from another electrical pad (creating a short circuit), also causes a change in resistance and triggers a tamper attempt. This is one example of security for secure circuit assembly 204.

Battery 402 provides backup power for data retention in volatile memory in case of power loss as well as providing continuous power to security sensors. Card guide 404 assists in guiding a credit card at a proper place and angle into reader 100.

FIG. 5 is a partial exploded parts diagram illustrating rear assembly 206 from FIG. 2 in a bottom-down orientation, as well as frame 208 and secure circuit assembly 204. FIG. 5 is in the reverse orientation of FIG. 3, such that communications assembly 202 (not illustrated in FIG. 5) is at the bottom of frame 208, with secure circuit assembly 204 shown on top of communications assembly 202 and inside of frame 208. Rear assembly 206 includes communications assembly 500, button support assembly 502, foam button support 504, battery 506, wireless charging pad 508, adhesive 510, rear support 512, adhesive 514, rear panel 516.

Communications assembly 500 may connect to PCB 400 and provide additional communication capability, for example one or more of the following: cellular, Bluetooth, Bluetooth LE, Wi-Fi, Zigbee, infrared, near field (NFC), etc. Button support assembly 502 and foam button support 504 in conjunction serve as button 106 (see FIG. 1) for power and sleep operations. Button support assembly 502 may connect to PCB 400. Battery 506 provides power to reader 100 and may be rechargeable or non-rechargeable. Examples of rechargeable battery types include lead-acid, nickel-cadmium (NiCd), nickel-metal hydride (NiMH), lithium-ion (Li-ion), lithium-ion polymer (LiPo), and rechargeable alkaline batteries. Wireless charging pad 508 may recharge battery 506 through wireless inductive charging. A magnetic loop antenna (copper coil) is used to create an oscillating magnetic field, which can create a current in one or more receiver antennas in wireless charging pad 508. This current may be used to recharge battery 506. Rear support 512 is bonded to wireless charging pad 508 with adhesive 510. Rear panel 516 is bonded to rear support 512 with adhesive 514. Rear panel 516 may be made from any suitable material, for example metal, glass, plastic, etc.

Figure 6:
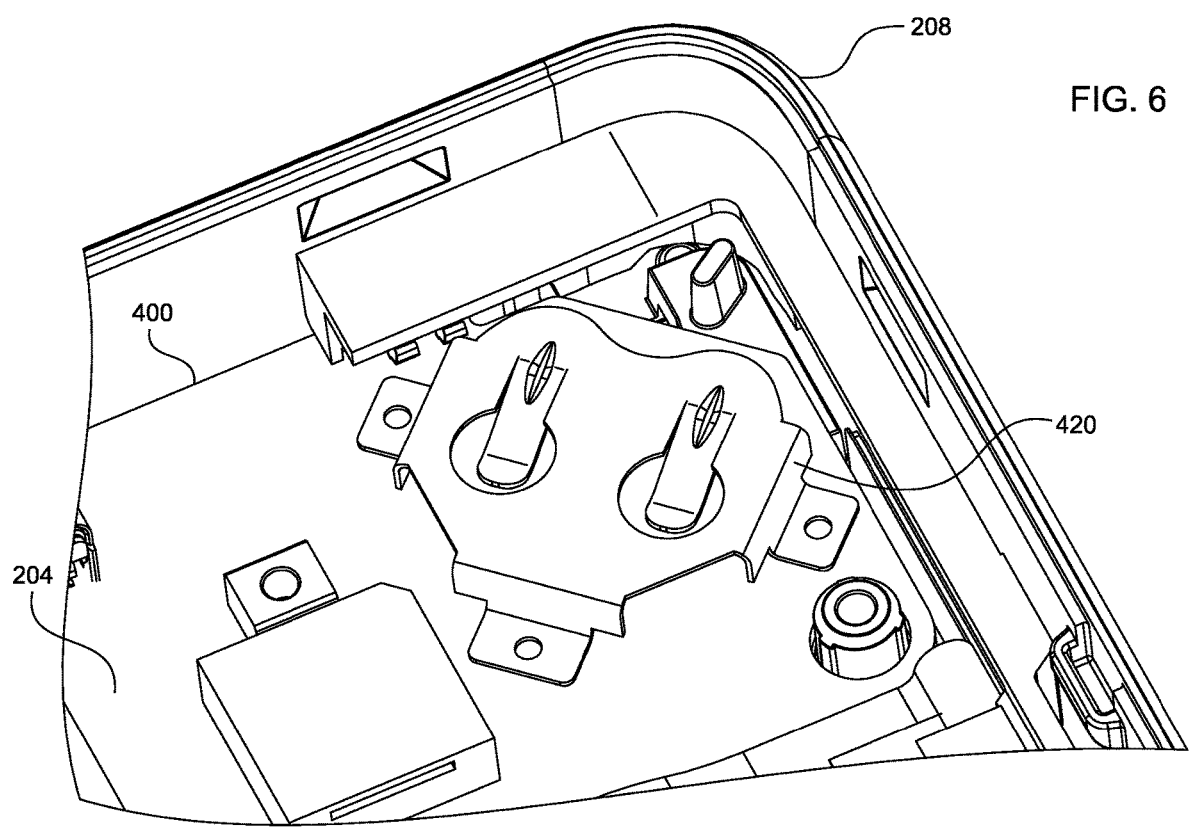
FIG. 6 is a top perspective view illustrating one example of a coin cell battery bracket.
Figure 7:
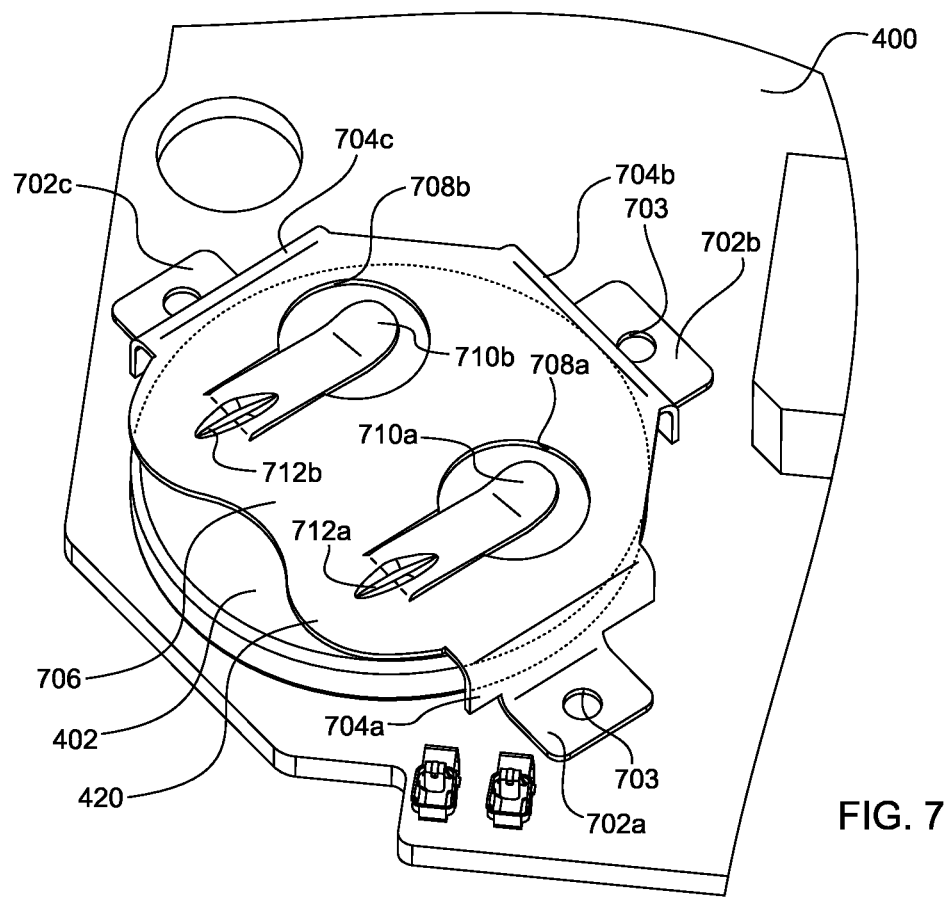
FIG. 7 is a close-up top angled perspective view illustrating one example of a coin cell battery bracket.

FIG. 6 is a top perspective view illustrating a cutout of secure circuit assembly 204 inside of frame 208 and one example of battery bracket 420. Battery bracket 420 is electrically connected to PCB 400. Battery bracket 420 may be sized to accept a coin cell battery (also referred to as a button cell), for example a CR2032, CR2032H, CR2025, SR516, LR1154/SR1154, etc. Although button cells are provided as examples, bracket 420 may be sized and shaped to fit another type of batter or another type of button/coin cell. Battery bracket 420 generally contacts the positive terminal of a battery (not shown in FIG. 6) along the sides and top (at the positive terminal), while the negative terminal of the battery on the opposite side of the positive terminal may contact an electrical terminal (not shown) on PCB 400. The battery contained in battery bracket 420 may be reserve or backup power for the electronic device, preserving volatile memory settings and other data in the device. Although this disclosure is directed to credit card processing devices, specifically point-of-sale readers and terminals, it should be understood that battery bracket 420 is suitable for any electronic device where robust attachment capability and better battery retention is desired. These may be commercial devices, retail, for civilian, military, emergency or any other use, FIG. 7 is a close-up top angled perspective view illustrating one example of coin cell battery bracket 420 with battery 402. Bracket 420 includes each of feet 702a, 702b and 702c (collectively referred to as feet 702). One or more of feet 702 may be electrically connected to a terminal of an electronic device, in one example a positive terminal of PCB 400. Each of feet 702 may have a hole 703 that may be used for attachment to PCB 400.

Each of feet 702 is connected to one of sidewalls 704. Foot 702a is connected to sidewall 704a. Foot 702b is connected to sidewall 704b. Foot 702c is connected to sidewall 704c (sidewalls 704a, 704b and 704c are collectively referred to as sidewalls 704). Sidewalls 704 connect to cover 706. Two contact holes 708a and 708b (collectively referred to as 708) within cover 706 house engagement arms 710a and 710b (collectively referred to as 710). In one example, engagement arms 710 have crimps 712a and 712b (collectively referred to as 712), which may provide additional elasticity to engagement arms 710. Engagement arms 710 exert pressure against battery 402 and and in turn PCB 400, improving the electrical connection between bracket 420 and battery 402, also improving the electrical connection between battery 402 and PCB 400, and provide holding power for battery bracket 420 with respect to battery 402. Crimps 712 may be any type of compression indentation. Other examples of increasing elasticity may be increasing the size of engagement arms 710, making the arms 710 from a material with a higher elasticity coefficient, decreasing the angle between engagement arms 710 and cover 706, and using a different finishing or thermal treatment. In one example, during manufacturing, after engagement arms 710 are cut from cover 706, an indentation tool (not shown) presses down and forms crimps 712. An increase in elasticity reduces the likelihood that engagement arms 710 become deformed after a drop. or reduces the amount of deformation. Following a drop, the elasticity may help engagement arms 710 better return to their original form and maintain their holding power. Some benefits conferred by increased elasticity include increased pass rates during post-manufacturing drop tests, and fewer customer returns when units are dropped in the field.

Battery 402 may be inserted into bracket 420 in the space between cover 706, sidewalls 704a and 704c, and PCB 400. When removing battery 402 from bracket 420, pressure may be applied to battery 402 in the space between sidewalls 702a, 702b, cover 706 and PCB 400 at a first contact point, and in the space between sidewalls 702b, 702c, cover 706 and PCB 400 at a second contact point.

Figure 8:
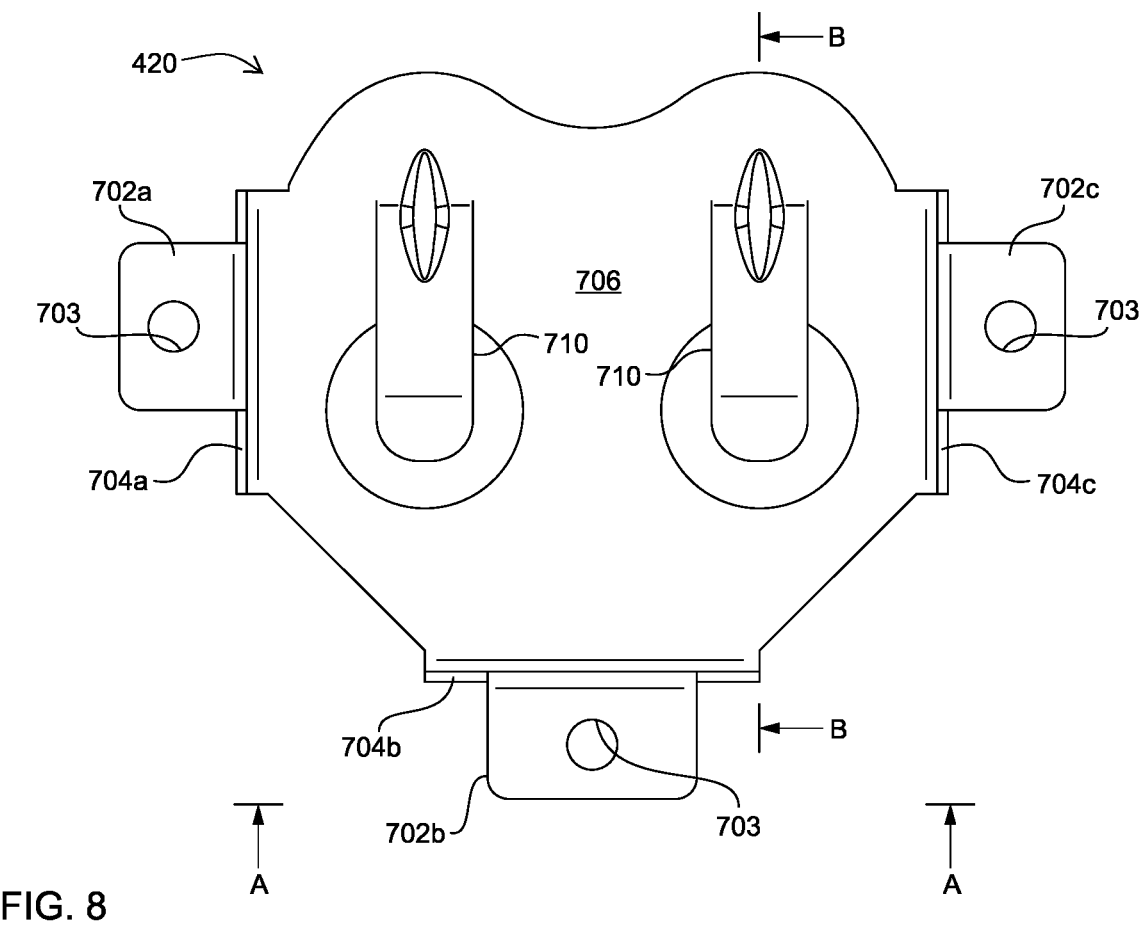
FIG. 8 is a top plan view illustrating one example of a coin cell battery bracket.

FIG. 8 is a top plan view illustrating one example of coin cell battery bracket 420. In one example, sidewalls 704a and 704c are parallel to one another and perpendicular to sidewall 704b. Feet 702 may be perpendicular to sidewalls 704. Sidewalls 704 may be perpendicular to cover 706. In one example feet 702 may be approximately 4×5 mm with hole 703 having a diameter of approximately 1.2 mm. In one example sidewalls 704a and 704c may be approximately 2.4 mm high and 7.25 mm wide. In one example sidewall 704b may be approximately 2.4 mm high and 8 mm wide. Engagement arms 710 may be approximately 2.3 mm wide and 6.55 mm long, with a distance between their centers being approximately 8 mm. The width of crimps 712 may be approximately 1.17 mm. Battery bracket 420 may be made from a phosphor bronze alloy and finished with a tin nickel plate. In one example, coin cell battery bracket 420 is sized for a CR1620 coin cell battery (not shown).

Figure 9:
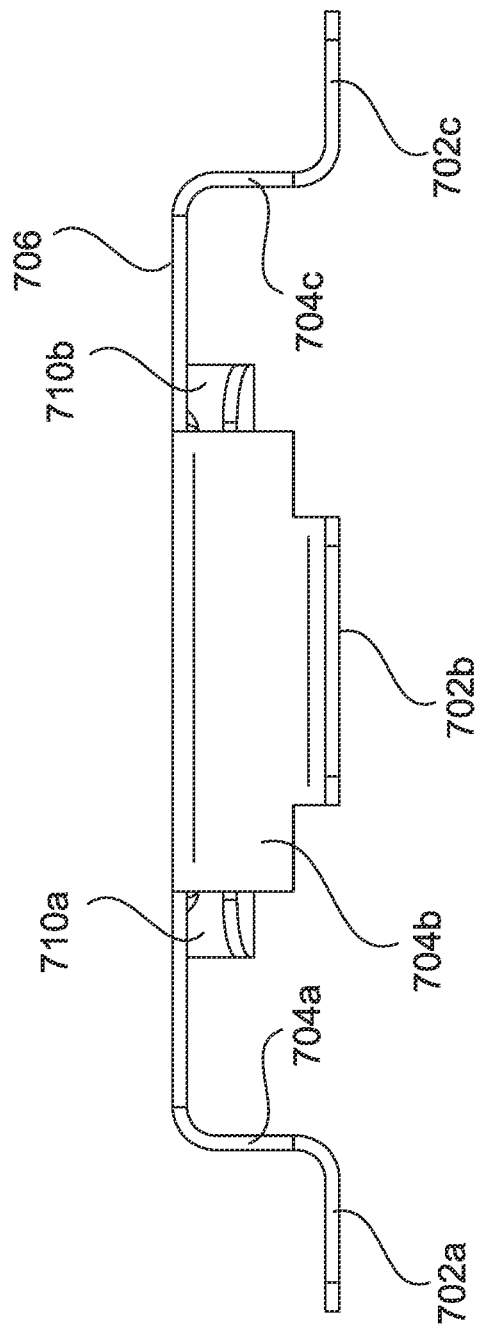
FIG. 9 is a side plan view along line A-A taken from FIG. 8 illustrating one example of a coin cell battery bracket.

FIG. 9 is a side plan view along the line A-A from FIG. 8 illustrating one example of coin cell battery bracket 420. Feet 702 may be parallel to one another and in the same plane as each other. Feet 702 may be parallel to a plane formed by cover 706 and in a separate plane from cover 706. Feet 702 may be perpendicular to sidewalls 704. Partially visible in FIG. 9 are engagement arms 710 behind sidewall 704b.

Figure 10:
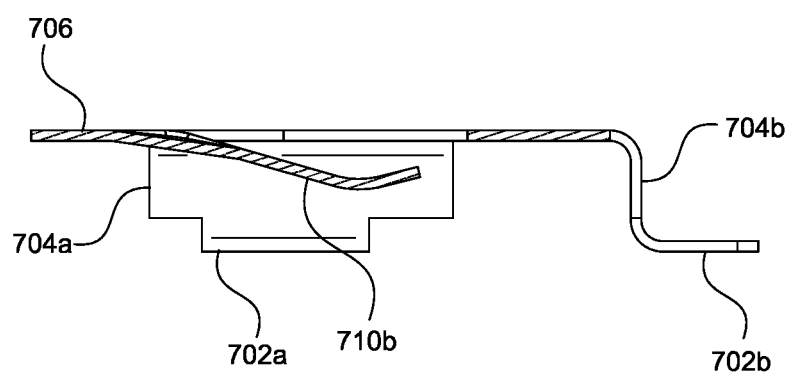
FIG. 10 is a side cutaway plan view along line B-B taken from FIG. 8 illustrating one example of a coin cell battery bracket.

FIG. 10 is a side cutaway plan view along the line B-B from FIG. 8 illustrating one example of coin cell battery bracket 420. Engagement arm 710b may extend away from the plane of cover 706 at an angle between 1 and 21 degrees, or between 11 and 21 degrees, or at approximately 16 degrees, or other similar angles or angular ranges. In one example and not illustrated in FIG. 10, engagement arms 710 end in a straight line from their departure from cover 706. In one example and not illustrated in FIG. 10, engagement arms 710 angle back toward cover 706 by a degree angle similar to the original departure angle, providing a more flat surface with which to engage battery 402 (not illustrated in FIG. 10). In FIG. 10, engagement arm 710b extends away from cover 706 along its length. Towards the end of engagement arm 710b, the angle returns closer to zero with respect to the difference in angle with cover 706, and further near the end of engagement arm 710b it angles up towards cover 706 by a degree angle similar to the original departure angle. Engagement arms 710 may have the same angles and shape as each other or their angles and shape may differ from one another. In FIG. 10 engagement arm 710a is hidden behind engagement arm 710b.

This disclosure refers to the term "reader" throughout, and while specifically directed towards a credit card reader, the disclosure applies equally well to a traditional credit card terminal. Nothing in the disclosure should be taken as limiting to a reader over a terminal. Moreover, many aspects of the disclosure apply equally well to any electronic device, as would be recognized by one skilled in the art.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a sensor signal", "means for generating a transmit signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps, or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include features of a claim to any other independent claim even if this claim is not directly made dependent on the independent claim.

What is claimed is:

1. An electronic component comprising:
    a printed circuit board (PCB) having a first and second battery contact; and
    a battery bracket having a first, a second and a third foot, each foot extending in a first plane, at least one of the feet connected to the first battery contact, each of the first, second and third feet coupled to a first, a second and a third sidewall, respectively, the sidewalls coupled to a flat cover extending in a second plane parallel to the first plane, the first and third sidewalls parallel to one another, the second sidewall perpendicular to the first and third sidewalls, the cover extending continuously from the first sidewall to the second sidewall, and from the second sidewall to the third sidewall, the battery bracket having a first open space between the first and second sidewalls and between the cover and the PCB, along a plane perpendicular to the cover, the cover fully encircling a first contact hole, a first engagement arm coupled to the cover and biased through the first contact hole and extending away from the second plane, a first crease located at the coupling of the cover and the first engagement arm, a first crimp located at the coupling of the cover and the first engagement arm.

2. The electronic component of claim 1, the battery bracket further comprising:
    the first crease and the first crimp being perpendicular to one another.

3. The electronic component of claim 2, the battery bracket further comprising:
    a third open space between the third and first sidewalls and between the cover and the PCB.

4. The electronic component of claim 2, the cover fully encircling a second contact hole, a second engagement arm coupled to the cover and biased through the second contact hole and extending away from the second plane.

5. The electronic component of claim 1, the cover having a near side to the PCB and a far side to the PCB, the first engagement arm extending from the far side of the cover and biased towards the PCB.

6. The electronic component of claim 4, the second engagement arm extending from the far side of the cover and biased towards the PCB.

7. The electronic component of claim 6, the first and second engagement arms integral to the cover, a second crease located at the coupling of the cover and the second engagement arm, a second crimp located at the coupling of the cover and the second engagement arm, the second crease and the second crimp being perpendicular to one another.

8. The electronic component of claim 1, wherein the first, second and third feet each have a centrally-positioned hole.

9. The electronic component of claim 1, wherein the first sidewall is perpendicular to the first foot, the second sidewall is perpendicular to the second foot, and the third sidewall is perpendicular to the third foot.

10. The electronic component of claim 7, the battery bracket further comprising:

a second open space between the second and third sidewalls and between the cover and the PCB, along a plane perpendicular to the cover.

11. The electronic component of claim 3, wherein the first and third sidewalls are coupled to opposite sides of the cover.

12. The electronic component of claim 11, the third open space sized to accommodate passage of a coin cell battery into the battery bracket; and
the first and second open spaces sized smaller than the coin cell battery and positioned to assist in removal of the coin cell from the battery bracket.

13. The electronic component of claim 12, the cover being continuous and having no gaps along a straight line from the first sidewall to the third sidewall, the straight line following the plane of the cover.

14. The electronic component of claim 13 further comprising a card reader.

15. The electronic component of claim 14 further comprising a point-of-sale credit card reader.

16. A battery bracket comprising:
a planar cover sized to conceal a majority of the surface area of one side of a coin cell battery, the cover consisting of three feet configured to be coupled to a printed circuit board (PCB) and conduct electricity thereto, the cover further comprising a plurality of engagement arms coupled to the cover and biased to extend away from the plane of the cover, the plurality of engagement arms each having a crimp and a crease between the respective engagement arm and the cover, the crimp and the crease being co-located with each other, the cover in conjunction with the PCB configured to have three openings, each of the three openings perpendicular to the plane of the cover, one of the three openings sized to accommodate a coin cell battery, two of the openings sized smaller than the coin cell battery.

17. The battery bracket of claim 16 further comprising a card reader.

18. The battery bracket of claim 17 further comprising a point-of-sale credit card reader.

19. An electronic component comprising:
a printed circuit board (PCB) having a first and second battery contact; and
a battery bracket having a first, a second and a third foot, each foot extending in a first plane, at least one of the feet connected to the first battery contact, each of the first, second and third feet coupled to a first, a second and a third sidewall, respectively, the sidewalls coupled to a flat cover extending in a second plane parallel to the first plane, first sidewall perpendicular to the first foot, the second sidewall perpendicular to the second foot, the third sidewall perpendicular to the third foot, the first and third sidewalls parallel to one another, the second sidewall perpendicular to the first and third sidewalls, the cover extending continuously from the first sidewall to the second sidewall, and from the second sidewall to the third sidewall, the battery bracket having a first open space between the first and second sidewalls and between the cover and the PCB, along a plane perpendicular to the cover, a second open space between the second and third sidewalls and between the cover and the PCB, along a plane perpendicular to the cover, the first and second open spaces sized smaller than a coin cell battery and positioned to assist in removal of the coin cell from the battery bracket, a third open space between the third and first sidewalls and between the cover and the PCB, the third open space sized to accommodate passage of a coin cell battery into the battery bracket, the cover fully encircling a first contact hole, a first engagement arm coupled to the cover and biased through the first contact hole and extending away from the second plane, the first engagement arm having a crimp and a crease co-located with one another, the cover fully encircling a second contact hole, a second engagement arm coupled to the cover and biased through the second contact hole and extending away from the second plane, the second engagement arm having a crimp and a crease co-located with one another, the cover having a near side to the PCB and a far side to the PCB, the first engagement arm coupled to the far side of the cover and biased towards the PCB, the second engagement arm coupled to the far side of the cover and biased towards the PCB.

20. The electronic component of claim 19 further comprising a point-of-sale credit card reader.

* * * * *